COMBINED AUTOMATIC GAIN CONTROL AND SYNCHRONIZING SIGNAL SEPARATION CIRCUITS
Filed Dec. 28, 1954
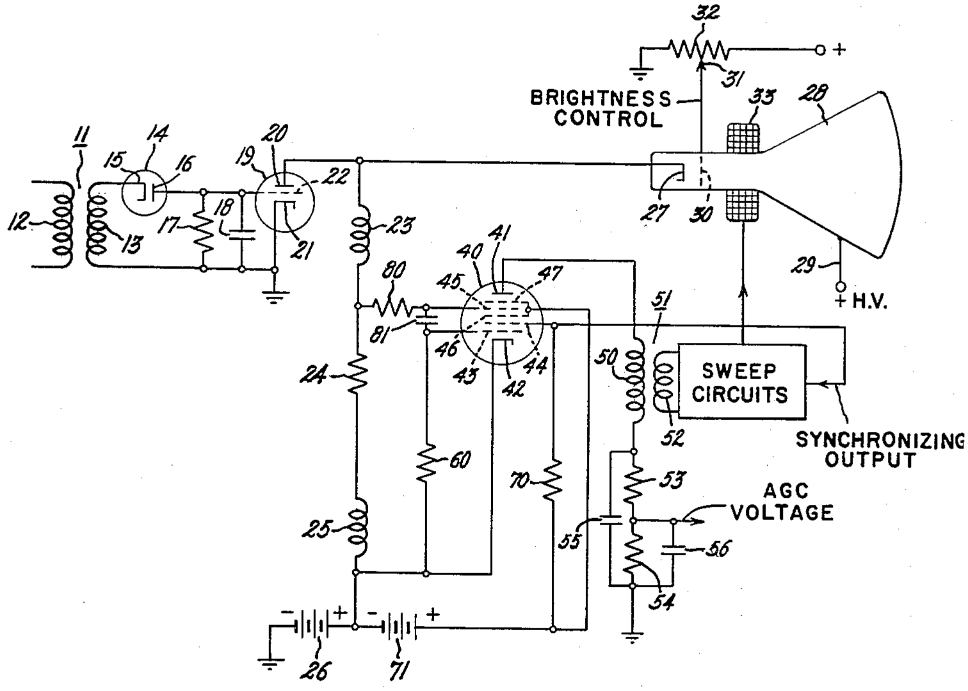
INVENTOR:
WOLF J. GRUEN,
BY Donald N. Timbie
HIS ATTORNEY.

2,810,783

COMBINED AUTOMATIC GAIN CONTROL AND SYNCHRONIZING SIGNAL SEPARATION CIRCUITS

Wolf J. Gruen, Syracuse, N. Y., assignor to General Electric Company, a corporation of New York Application December 28, 1954, Serial No. 478,157
7 Claims. (Cl. 178—7.3)

The present invention relates generally to circuits for controlling the operation of television receivers, or the like, and, more particularly, to a combined automatic-gain control and synchronizing signal separation circuit of a type that is suitable for television receivers constructed in accordance with present-day standards of operation, though not necessarily limited exclusively thereto.

In accordance with present-day television broadcasting standards in the United States of America, negative amplitude modulation of the video carrier wave is employed to transmit the picture information. Blackness of a transmitted scene corresponds to 75% negative modulation of the carrier wave. The 75% signal amplitude level is that at which the blanking pulses are normally transmitted and is referred to as the pedestal level. The region between 75 and 100 percent of maximum signal amplitude is known as the "blacker than black" region and is utilized for transmitting the horizontal and vertical synchronizing information in the form of pulses. These synchronizing pulses are transmitted during the blanking period, i. e., during intervals when the picture scanning beam is interrupted or blacked out between line scanning traces. In the composite television signal wave, therefore, the synchronizing pulses appear as "spikes" atop the blanking pulses.

In order to stabilize the amplification characteristics of the television receiver in response to fluctuations in a received signal wave, it is common practice to employ automatic-gain-control circuitry. One form of automatic-gain-control circuitry provides for selective sampling and rectification of the synchronizing information and derives therefrom a gain control voltage corresponding to the average amplitude thereof. Such circuits are normally termed "keyed" A. G. C. systems and offer the advantage of greater immunity to interfering noise transients.

Another function essential to the operation of a television receiver is the separation of the synchronizing pulses from the composite signal wave in order to synchronize the scanning operations of the receiver with those of the selected transmitter to which it is tuned at any given moment. In view of the fact that the synchronization pulses are transmitted above the pedestal level in the "blacker than black" region of the composite wave, a known method of separating them from the rest of the signal, appearing below the pedestal level, is to utilize this feature in an amplitude discriminatory separation circuit responsive only to signals above a predetermined value, namely, in accordance with the present television standards, the 75% level or the pedestal level.

It is an object, therefore, of the present invention to provide improved circuitry capable of performing both the functions of deriving an automatic-gain-control voltage corresponding to synchronizing pulse amplitudes and separating the synchronization pulses from the composite television signal wave.

It is another object of the present invention to provide an improved circuit for performing these two functions employing a single electron discharge device.

It is a further object of the present invention to provide a single stage combined keyed A. G. C. circuit and synchronizing pulse separation circuit wherein the derived synchronization signal is independent of the amplitude of the picture component.

Briefly stated, in accordance with one aspect of the present invention there is provided a novel circuit having application as a combination keyed automatic-gain-control circuit and synchronizing signal separation circuit in television receivers or the like adapted to receive and demodulate a composite signal wave including an intelligence component having an average amplitude within a predetermined value and a recurrent pulse component having an average amplitude ranging beyond the predetermined value. The circuit includes a multigrid electron discharge device having an anode and a cathode and at least three grid electrodes situated therebetween. The cathode and two of the grid electrodes are connected as a synchronizing signal separation circuit which includes a source of unidirectional operating potential applied to one of the grids and a self-biasing grid circuit associated with the other grid. An external anode-to-cathode path is provided for the device and includes means for applying thereto an operating potential, which in a preferred embodiment may comprise a gating wave form at the recurrence rate of the received pulse component, which may preferably further comprise a pulsating unidirectional potential of substantially constant amplitude. Alternating-current coupling means are provided for applying the demodulated signal wave to the control grid of the synchronizing signal separating circuit and direct-current coupling means are provided for coupling the demodulated signal to the third grid. A load impedance circuit associated with the synchronizing signal separator provides means for deriving a signal-wave corresponding to the applied pulse component. A load-impedance circuit connected to the external anode-to-cathode path provides means for deriving a voltage proportional to the peak amplitude of the pulse component of the demodulated wave. In a preferred embodiment, an integrating circuit is associated with the anode-to-cathode load-circuit in order to smooth the derived voltage over a plurality of pulse intervals.

For additional objects and advantages, and for a better understanding of the invention, attention is now directed to the following description and accompanying drawing. The features of the invention which are believed to be novel are particularly pointed out in the appended claims.

In the drawing the figure shows a schematic circuit diagram of a portion of a television receiving apparatus embodying one form of the present invention.

Referring now to the figure, there is shown a coupling transformer 11 having a primary winding 12 and a secondary winding 13. The primary 12 is connected to a source (not shown) of amplitude-modulated waves, such as an intermediate-frequency amplifier. The secondary is connected to a diode-detector circuit including a diode device 14 comprising a cathode 15 and an anode 16. One end of the secondary 13 is connected to the cathode 15 and the other end is connected to common ground. The anode is connected to a diode load-resistor 17 having its other end connected to common ground. A diode load bypass capacitor 18 is connected across the resistor 17 in a conventional manner. The output of the diode-detector circuit, which appears across the load resistor 17 and the capacitor 18, is coupled directly to the video amplifier comprising electron discharge device 19. Device 19 may conveniently be of the triode type, as shown, comprising an anode 20, a cathode 21 and a control electrode 22. The coupling from the detector 14 to the amplifier 19 is accomplished by means of a direct connection from the anode 16 to the control grids 22 so as to provide D.-C. coupling therebetween. The cathode 21 is connected directly to ground in order to complete the required circuit paths, as is well-known in the art. The anode 20 is connected to one side of a load-impedance comprising a choke coil 23 connected in series with a constant impedance circuit comprising, in turn, a resistor 24, a choke coil 25, a resistor 80, and the input capacitance of device 40. The other side of the aforesaid load-impedance is connected to the positive side of a source of operating potential 26 having its negative terminal connected to ground in a conventional manner. The anode 20 of the video amplifier is also connected directly to the cathode 27 of a cathode-ray type picture tube 28. It is noted that the above-mentioned constant impedance network may, in other embodiments, comprise other well-known video compensation networks which function in known manner to insure desired frequency and phase response characteristics of the video signal wave.

The image reproducing device in the form of a picture tube 28 is of conventional design and, in addition to the cathode 27, it comprises a conventional cathode-ray electrode system including a high-voltage anode connection 29 and a control electrode 30. In order to complete the usual grid-cathode circuit path for the picture tube 28 the grid 30 is connected to a variable tap 31 on a resistor 32 having one end connected to ground and the other end connected to a suitable source of positive biasing potential. The brightness of a depicted scene on the picture tube 28 may be adjusted in conventional manner by means of the tap 31 on the resistor 32.

The usual raster for the picture tube 28 may be defined in known manner as by the deflection coil system shown representatively at 33. The sweep or deflection coil system may be energized from the sweep circuits shown in block diagram form, which may include the usual vertical and horizontal oscillation generators which, in turn, may be synchronized with the sweep system of a selected transmitter by means of the synchronizing signals derived in accordance with the teachings of the present invention.

A combination keyed automatic-gain-control circuit and synchronizing pulse separation circuit is coupled to a suitable source of video signals shown as the output of the video amplifier 19. This combination circuit comprises an electron discharge device 40 which may preferably be of the pentagrid type, as shown, including an anode 41, a cathode 42, a first control grid 43, an anode grid 44, a second control grid 45 and a pair of screen grids 46 and 47 disposed on opposite sides of the second control grid 45. The two screen grids 46 and 47 may conveniently be connected together internally of the electron discharge device 40, as illustrated. An external anode-to-cathode path for the device 40 is provided with a source of operating potential and in the present embodiment this is provided by means of the secondary winding 50 whose primary 52 is connected to a keying source of pulsating D.-C. potential of positive polarity, which, in the present case, is illustrated as the sweep circuit of a television receiver. The end of the secondary 50 remote from the anode 41 is connected through a load-impedance circuit to ground. The load-circuit comprises a first resistance 53 in series with a second resistance 54 to ground. A first capacitor 55 shunts both resistances 53 and 54, and another capacitance 56 shunts only the resistor 54 to ground. The network thus formed by the two resistances 53, 54 and capacitances 55, 56 forms a conventional low-pass filter capable of smoothing the derived gain-control voltage in known manner. An automatic-gain-control voltage terminal, so indicated, is provided for deriving an automatic-gain-control voltage for application to prior portions of the circuit to control the receiver gain in known manner. With further reference to the device 40, the cathode 42 is connected to the positive side of the source 26. The first control grid 43 is likewise connected to the positive side of the source 26 by means of a self-biasing resistor 60. The anode grid 44, adjacent the first control grid 43, is connected through a load impedance, shown as a resistance 70, to the positive side of a second source of potential shown as the battery 71 having its negative terminal connected to the cathode 42. A connection from the anode grid 44 to the sweep circuits provides means for deriving the synchronizing output from the device 40 in a manner to be described.

The second control grid 45 is connected by means of a resistance 80 to the junction between the choke coil 23 and the series circuit comprising resistance 24 and choke coil 25. Thus, a direct-current connection is provided from the anode of the video amplifier 19 to the second control grid of the combination device 40. A capacitance 81 connects the second control grid 45 to the first control grid 43. Thus, an alternating-current connection is provided from the anode of the video amplifier 19 to the first control grid 43.

Briefly stated, the operation of the above-described circuit is as follows:

A signal-modulated carrier wave is coupled to the detector device 14 by means of the transformer 11. The output of the detector appears across resistor 17 with respect to ground. In accordance with present-day standards, as mentioned above, the polarity of the detected signal-wave is such that the anode of the device 14 becomes more negative in potential as the amplitude of the synchronization pulses increases. Thus, it may be said that the detector output voltage appears across resistor 17 with the synchronizing pulses in a negative-going sense. However, it is necessary, according to present standards, to supply video signal waves to the cathode 27 of the cathode-ray tube 28 of such polarity that the synchronization pulses are positive-going. This is accomplished by the amplifier device 19 which inverts the phase of the signal wave in a well-known manner as well as amplifying its intensity. Thus, the output of amplifier 19 appearing across the video load-impedance network including choke 23, resistance 24 and choke 25 is such that the synchronization pulses are positive-going in polarity.

Substantially the entire output of the video amplifier, including the synchronization pulses in their demodulated form, appears across the series circuit including resistor 24 and choke coil 25 and is coupled through the resistance 80 to the first and second control grids of the combination A. G. C. and synchronization separation circuit comprising device 40.

First considering the signal applied to the second grid 45, and considering that the plate supply voltage to the device 40 contains a gating signal in the form of positive pulses of horizontal repetition rate, a negative automatic-gain-control voltage is developed in the plate-load circuit by means of plate-rectification in accordance with known principles of operation. The magnitude of the automatic-gain control voltage developed across the impedance comprising resistor 54, capacitor 56 is determined by the average plate current, hence, by the peak value of the video signal. When the signal on the second control grid 45 approaches the positive potential of the source 26, approximately at cut-off of amplifier 19, the device 40 enters the state of conduction and produces sufficient negative automatic-gain-control voltage across the plate load-resistor to control the receiver gain such as to prevent the video output signal from increasing further.

It will be apparent that the keyer for device 40 is required to pass current for the duration of the horizontal synchronizing interval only and, although it may do so, it need not conduct during the rest of the time insofar as it affects the operation of the keyer. Bearing this in mind, let us now consider that the video information is A. C. coupled by means of the capacitance 81 to the first control grid 43 of the device 40. It is now pointed out that the cathode 42, the first control grid 43, and the anode grid 44 may be adjusted to act as a clipper circuit for the synchronizing pulses with the synchronizing output appearing across the anode-grid load-resistor 70. This may be accomplished by adjusting the value of the circuit components including resistor 60 and capacitor 81 so that the triode circuit thus provided will be self-biasing and thus provide a substantially uniform flow of electrons from the cathode 42 toward the anode 41 during each synchronizing pulse irrespective of the peak-to-peak amplitude of the applied signal wave. In accordance with common parlence in the art, the synchronizing signal separation circuit is "clamped to the peak of the synchronizing pulses."

It is pointed out that by deriving the keying pulse for the anode 41 of the device 40 from the sweep circuits, say for example, the fly-back pulse of the horizontal sweep generator, the keying pulses may, in turn, be maintained in their appropriate timing sequence by means of the synchronizing output derived from the anode grid 44, in accordance with the principles of the present invention.

The above-described preferred embodiment of applicant's invention, in which the operating potential applied to the anode 41 of the device 40 comprises a keying pulse, affords the advantage of a relatively high degree of noise immunity.

Where the circuit requirements do not necessitate the relatively high noise immunity afforded by the aforesaid keyed-gain-control circuit, a substantially continuous operating potential may be applied to the anode 41 through a suitable load resistor instead of the keying pulses across the secondary winding 50. In such case, nevertheless, it may be desirable to insure that the gain control voltage is negative with respect to a given reference potential. This may be accomplished by connecting the load circuit comprising resistors 53 and 54 and capacitors 55 and 56 in parallel circuit relation with the above-mentioned load resistor and by returning the resistor 54 of the load circuit to a suitable negative reference potential, such that the reference point for the gain control voltage may be established at the desired predetermined reference point.

It is noted that the composite signal wave coupled by means of the D. C. path to the second control-grid contains the usual D. C. component of the demodulated standard television signal wave. This D. C. component prevents blocking of the gain controlled amplifier in a manner well known to those skilled in the art.

It is further pointed out that, in the present embodiment, the second control grid 45 is biased, by means of its D. C. connection to the load-resistor 24 for the video amplifier stage including the device 19. The first control grid 43 is self-biased by the resistance 60, as described above.

In a preferred embodiment it was found that the device 40 might appropriately comprise a commercially available type 7B8 vacuum tube and that under such conditions a synchronizing output voltage of 10 to 20 volts was available.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall with the true spirit and scope of the invention.

What I claim as new and desire to secure by Letters Patent of the United States is:

1. In a television receiver adapted to receive and demodulate a composite signal wave including an intelligence component having an average amplitude within a predetermined range of values and a recurrent pulse component having an average amplitude ranging beyond said predetermined value in a positive direction, an electron discharge device including a cathode, an anode, and a first control grid, an anode grid, and a second control grid, said grids being positioned intermediate said cathode and anode in the order named, an external anode-to-cathode path for said device, means for applying an operating potential to said anode-to-cathode path, a low-pass filter included in said anode-to-cathode path, means for biasing said second control grid in such manner as to prevent electron flow to said anode for signals below said predetermined value, means comprising an A. C. path for applying the demodulation product of said composite wave to said first control grid, means comprising a D. C. path for applying the demodulation product of said composite wave to said second control grid, a synchronizing signal separation circuit for deriving a recurrent output-response-voltage corresponding to said pulse component, said separator circuit including said cathode, said first control grid, said anode grid and an external anode-grid-to-cathode circuit path, said anode-grid-to-cathode circuit path including a source of unidirectional operating potential and a load-impedance connected in series circuit relation.

2. In a television receiver adapted to receive and demodulate a composite signal wave including an intelligence component having an average amplitude within a predetermined value and a recurrent pulse component having an average amplitude ranging beyond said predetermined value in a positive direction, an electron discharge device including a cathode, an anode, and a first control grid, an anode grid, and a second control grid, said grids being positioned intermediate said cathode and anode in the order named, an external anode-to-cathode path for said device, means for applying an operating potential in the form of a gating wave having a substantially constant amplitude to said anode-to-cathode path at a predetermined repetition rate corresponding to the recurrence rate of said pulse component, means included in said anode-to-cathode path comprising a load-circuit for development of a voltage proportional to the peak amplitude of said pulse component, means for biasing said second control grid in such manner as to prevent electron flow to said anode for signals below said predetermined value, means comprising an A. C. path for applying the demodulation product of said composite wave to said first control grid, means comprising a D. C. path for applying the demodulation product of said composite wave to said second control grid, a synchronizing signal separation circuit for deriving a recurrent output response voltage corresponding to said pulse component, said separator circuit including said cathode, said first control grid, said anode grid and an external anode-grid-to-cathode circuit path, said anode-grid-to-cathode circuit path including a source of unidirectional operating potential and a load impedance connected in series circuit relation.

3. In a television receiver adapted to receive and demodulate a composite television signal wave including an intelligence component having an average amplitude within a predetermined value and recurrent vertical and horizontal pulse components, said pulse components having an average amplitude ranging beyond said predetermined value in a positive direction, an electron discharge device including a cathode, an anode, and a first control grid, an anode grid, and a second control grid, said grids being positioned intermediate said cathode and anode in the order named, an external anode-to-cathode path for said device, means for applying an operating potential having a gating wave-form to said anode-to-cathode path at a predetermined repetition rate corresponding to the recurrence rate of said pulse components, means included in said anode-to-cathode path comprising a load-circuit for development of a voltage proportional to the peak amplitude of said pulse components, means for biasing said second control grid in such manner as to prevent electron flow to said anode for signals below said predetermined value, means comprising an A. C. path for applying the demodulation product of said composite wave to said first control grid, means comprising a D. C. path for applying the demodulation product of said composite wave to said second control grid, a synchronizing signal separation circuit for deriving a recurrent output-response voltage corresponding to said pulse components, said separator circuit including said cathode, said first control grid, said anode grid and an external anode-grid-to-cathode circuit path, said anode-grid-to-cathode circuit path including a source of unidirectional operating potential and a load-impedance connected in series circuit relation.

4. In a television receiver adapted to receive and demodulate a composite signal wave including an intelligence component having an average amplitude within a predetermined value and a recurrent pulse component having an average amplitude ranging beyond said predetermined value in a positive direction, a pentagrid electron discharge device including a cathode, an anode, a first control grid, an anode grid, and a second control grid, said grids being positioned intermediate said cathode and anode in the order named, a pair of screen-grids positioned adjacent said second control grid on either side thereof, an external anode-to-cathode path for said device, means for applying an operating potential to said anode-to-cathode path, means included in said anode-to-cathode path comprising a load-circuit for development of a voltage proportional to the peak amplitude of said pulse component, means for biasing said second control grid in such manner as to prevent electron flow to said anode for signals below said predetermined value, means comprising an A. C. path for applying the demodulation product of said composite wave to said first control grid, means comprising a D. C. path for applying the demodulation product of said composite wave to said second control grid, a synchronizing-signal separation circuit for deriving a recurrent output voltage corresponding to said pulse component, said separator circuit including said cathode, said first control grid, said anode-grid and an external anode-grid-to-cathode circuit path, said anode-grid-to-cathode circuit path including a source of unidirectional operating potential and a load-impedance connected in series circuit relation.

5. In a television receiver adapted to receive and demodulate a composite signal wave including an intelligence component having an average amplitude within a predetermined value and a recurrent pulse component having an average amplitude ranging beyond said predetermined value in a positive direction, a pentagrid electron discharge device including a cathode, an anode, a first control grid, an anode grid, and a second control grid, said grids being positioned intermediate said cathode and anode in the order named, a pair of screen grids positioned adjacent said second control grid on either side thereof, an external anode-to-cathode path for said device, means for applying an operating potential having a gating wave-form to said anode-to-cathode path at a predetermined repetition rate corresponding to the recurrence rate of said pulse component, means included in said anode-to-cathode path comprising a load-circuit for development of a voltage proportional to the peak amplitude of said pulse component, means for biasing said second control grid in such manner as to prevent electron flow to said anode for signals below said predetermined value, means comprising an A. C. path for applying the demodulation product of said composite wave to said first control grid, means comprising a D. C. path for applying the demodulation product of said composite wave to said second control grid, a synchronizing signal separation circuit for deriving a recurrent output voltage corresponding to said pulse component, said separator circuit including said cathode, said first control grid, said anode grid and an external anode-grid-to-cathode circuit path, said anode-grid-to-cathode circuit path including a source of unidirectional operating potential and a load impedance connected in series circuit relation.

6. In a television receiver adapted to receive and demodulate a composite signal wave including an intelligence component having an average amplitude within a predetermined value and a recurrent pulse component having an average amplitude ranging beyond said predetermined value in a positive direction, a video amplifier stage including a first electron discharge device having an anode-cathode path, means for applying the demodulation product of said composite wave to said video amplifier stage, a second electron discharge device including a cathode, an anode, and a first control grid, an anode grid, and a second control grid, said grids being positioned intermediate said cathode and anode in the order named, an external anode-to-cathode path for said second device, means for applying an operating potential to the anode-to-cathode path of said second device, means comprising an A. C. path for coupling the output of said video amplifier stage to said first control grid, means comprising a D. C. path for coupling the output of said video amplifier stage to said second control grid. Means included in the anode-to-cathode path of said second device comprising a load-circuit for developement of a voltage proportional to the peak amplitude of said pulse component, means comprising a source of unidirectional potential and a load-impedance for energizing the anode-cathode path of said first device, means including a D. C. path from the load-impedance of said first device to the second control grid of said second device for biasing said second device beyond conduction for signals below said predetermined value, a synchronizing signal separation circuit for deriving a recurrent output-response voltage corresponding to said pulse component, said separator circuit including said cathode, said first control grid, said anode grid and an external anode-grid-to-cathode circuit path, said anode-grid-to-cathode circuit path including a source of unidirectional operating potential and a load impedance connected in series circuit relation.

7. In a television receiver adapted to receive and demodulate a composite signal wave including an intelligence component having an average amplitude within a predetermined value and a recurrent pulse component having an average amplitude ranging beyond said predetermined value in a positive direction, a video amplifier stage including a first electron discharge device having an anode-cathode path, means for applying the demodulation product of said composite wave to said video amplifier stage, a second electron discharge device including a cathode, an anode, and a first control grid, an anode grid, and a second control grid, said grids being positioned intermediate said cathode and anode in the order named, an external anode-to-cathode path for said second device, means for applying an operating potential having a gating waveform to the anode-to-cathode path of said second device at a predetermined repetition rate corresponding to the recurrence rate of said pulse component, means comprising an A. C. path for coupling the output of said video amplifier stage to said first control grid, means comprising a D. C. path for coupling the output of said video amplifier stage to said second control grid, means in the anode-to-cathode path of said second device comprising a load-circuit for development of a voltage proportional to the peak amplitude of said pulse component, means comprising a source of unidirectional potential and a load-impedance for energizing the anode-cathode path of said first device, means including a direct-current path from the load-impedance of said first device to the second control grid of said second device for biasing said second device beyond conduction for signals below said predetermined value, a synchronizing signal separation circuit for deriving a recurrent output-response voltage corresponding to said pulse component, said separator circuit including said cathode, said first control grid, said anode grid and an external anode-grid-to-cathode circuit path, said anode-grid-to-cathode circuit path including a source of unidirectional operating potential and a load-impedance connected in series circuit relation.

References Cited in the file of this patent

UNITED STATES PATENTS 2,632,802 Vilkomerson ------------ Mar. 24. 1953